United States Patent
Maucher et al.

(10) Patent No.: US 11,815,138 B2
(45) Date of Patent: Nov. 14, 2023

(54) CONSTANT VELOCITY JOINT

(71) Applicant: GKN Driveline International GmbH, Lohmar (DE)

(72) Inventors: Stephan Maucher, Siegburg (DE); Anna Gremmelmaier, Sankt Augustin (DE); Wolfgang Hildebrandt, Siegburg (DE); Thomas Weckerling, Sankt Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 377 days.

(21) Appl. No.: 17/257,594

(22) PCT Filed: Jul. 5, 2018

(86) PCT No.: PCT/EP2018/068263
§ 371 (c)(1),
(2) Date: Jan. 4, 2021

(87) PCT Pub. No.: WO2020/007475
PCT Pub. Date: Jan. 9, 2020

(65) Prior Publication Data
US 2021/0270325 A1    Sep. 2, 2021

(51) Int. Cl.
  *F16D 3/223* (2011.01)
  *F16D 3/2237* (2011.01)
(52) U.S. Cl.
  CPC .......... *F16D 3/2237* (2013.01); *F16D 3/223* (2013.01); *F16D 2003/22309* (2013.01); *Y10S 464/906* (2013.01)
(58) Field of Classification Search
  CPC .............. F16D 3/2237; F16D 3/223; F16D 2003/22309; Y10S 464/906

(Continued)

(56) References Cited

U.S. PATENT DOCUMENTS 6,186,899 B1 * 2/2001 Thomas ............... F16D 3/2237
                                                          464/145
8,267,802 B2   9/2012 Kobayashi et al.
(Continued)

FOREIGN PATENT DOCUMENTS

DE   102012102678 A1  10/2013
EP      0802341 A1   10/1997
(Continued)

OTHER PUBLICATIONS

International Search Report and Written Opinion for PCT/EP2018/068263 dated Mar. 25, 2019 (13 pages; with English translation).

*Primary Examiner* — Greg Binda
(74) *Attorney, Agent, or Firm* — Bejin Bieneman PLC (57) ABSTRACT

A constant velocity joint comprises an outer joint part with outer ball tracks and an inner joint part with inner ball tracks. An outer ball track and an inner ball track respectively form a pair of tracks with one another; in each, a torque-transmitting ball is guided. The torque-transmitting balls are accommodated in a ball cage with circumferentially distributed cage windows. In any angular position of the constant velocity joint an opening angle is formed between an outer tangent to the outer ball track and an inner tangent to the inner ball track. At an articulation angle of zero degrees the opening angle is greater than zero degrees. A central articulation angle range is defined with articulation angles less than fifteen degrees. The opening angle increases by at least two degrees within the central articulation angle range, and is less than twelve degrees for all articulation angles within the central articulation angle range.

17 Claims, 5 Drawing Sheets

(58) Field of Classification Search
USPC .......................................................... 464/145
See application file for complete search history.

(56) References Cited

U.S. PATENT DOCUMENTS

| | | | |
|---|---|---|---|
| 9,133,887 B2 * | 9/2015 | Hildebrandt | .......... F16D 3/2245 |
| 2010/0190558 A1 | 7/2010 | Oh et al. | |
| 2017/0037909 A1 | 2/2017 | Shinoda et al. | |

FOREIGN PATENT DOCUMENTS

| | | | | |
|---|---|---|---|---|
| EP | 2594821 A2 * | 5/2013 | ........... | F16D 3/2237 |
| JP | H08-26899 B2 | 3/1996 | | |
| JP | 2009-085326 A | 4/2009 | | |
| WO | 0031427 A1 | 6/2000 | | |
| WO | 2007028436 A1 | 3/2007 | | |
| WO | 2014154838 A1 | 10/2014 | | |

* cited by examiner

CONSTANT VELOCITY JOINT

CROSS-REFERENCE TO RELATED APPLICATIONS

This application is a national stage of, and claims priority to, Patent Cooperation Treaty Application No. PCT/EP2018/068263, filed on Jul. 5, 2018, which application is hereby incorporated herein by reference in its entirety.

BACKGROUND

Constant velocity joints allow torque to be transmitted between the outer joint part and inner joint part with angular movement.

Basically, a distinction is made between constant velocity joints in the form of fixed joints and plunging joints. Constant velocity fixed joints substantially allow only angular movement between the outer joint part and inner joint part, i.e. apart from usual tolerances, no axial movements are provided. In contrast thereto, constant velocity plunging joints allow not only angular movements but also axial movements between the outer joint part and inner joint part.

A constant velocity joint in the form of a fixed type joint is known from DE 10 2012 102 678 A1. In any angular position of the constant velocity joint, an opening angle is enclosed between an outer tangent and an inner tangent to a ball. The pairs of tracks are configured such that for at least one joint articulation angle within a small articulation angle range, an opening angle is zero, and within a larger articulation angle range, an opening-sided opening angle of a ball moving to the opening side of the outer joint part and an attachment-sided opening angle of a ball moving to the attachment side of the outer joint part at the same joint articulation angle are unequal to zero and open in the same axial direction.

A constant velocity joint in the form of a fixed joint with eight torque-transmitting balls is known from EP 0 802 341 A1. The pairs of ball tracks, each consisting of an outer ball track and an inner ball track, open to the opening side of the joint. In an embodiment, the ball tracks have a uniform radius along their length. In another embodiment, the ball tracks are composed of a radius and an adjoining straight line; such constant velocity joints are also known as undercut-free joints (UF joints).

From U.S. Pat. No. 2,010,190 558 A1 a constant velocity joint in the form of a fixed joint is known. In an embodiment it is provided that the ball tracks of the outer joint part comprise two circular arc sections with different centers and an intermediate straight section. The straight section tangentially adjoins the two circular arc sections. The circular arc sections are configured such that, when the joint is articulated, an opening angle at the ball traveling in the direction of the opening side and an opening angle at the ball traveling in the direction of the joint base open in opposite axial directions.

From U.S. Pat. No. 8,267,802 B2, a fixed-type constant velocity joint is known in which the centers of the outer and inner ball tracks are offset from a spherical face center point. The ratio of an axial offset (F) relative to the pitch circle radius (PCR) is between 0.045 and 0.065. A fixed-type constant velocity joint is also known with a curved track portion and a straight track portion, which merge into each other in the joint center plane. A fixed-type constant velocity joint with a uniformly curved track portion over the entire track length is also known.

Regarding the design of constant velocity joints there are various, sometimes contradictory, requirements to be met. An important goal is to keep the reaction forces of the joint components interacting during operation as low as possible in order to minimize power losses and maximize the efficiency of the joint. At the same time, the constant velocity joint should work reliably and as wear-free as possible in all angular positions occurring during operation.

SUMMARY

The present disclosure relates to a constant velocity joint for torque transmission, with an outer joint part with outer ball tracks, an inner joint part with inner ball tracks, torque-transmitting balls guided in pairs of outer and inner ball tracks, and a ball cage which receives the balls in circumferentially distributed windows and holds them in a common plane. Thus described is a constant velocity joint which allows reliable cage control even at small articulation angles and in which only small reaction forces occur between the joint parts that are in contact with each other, so that friction losses are correspondingly low.

Accordingly, a constant velocity joint is described, comprising: an outer joint part with a longitudinal axis and outer ball tracks, wherein the outer joint part having an attachment side and an opening side; an inner joint part with a longitudinal axis and inner ball tracks, wherein an outer ball track and an inner ball track respectively forming a pair of tracks with each other; a torque transmitting ball in each pair of tracks; a ball cage disposed between the outer joint part and the inner joint part and having circumferentially distributed cage windows each receiving at least one of the torque-transmitting balls, wherein the balls in the ball cage define a joint center plane (EM) when the longitudinal axes of the inner joint part and the outer joint part are coaxially aligned, the two longitudinal axes (L12, L13) defining a joint articulation plane (EB) at articulation angles (ß) deviating from zero degrees; wherein, viewed in the joint articulation plane (EB), in any angular position of the constant velocity joint an opening angle (δ) is formed between an outer tangent (T) applied to the outer ball track in an outer contact point between the outer ball track and the ball, and an inner tangent (T') applied to the inner ball track in an inner contact point between the inner ball track and the ball; wherein the centers of the balls as they move along the outer and inner ball tracks each define a center line (A, A'); wherein at least one of the pairs of tracks includes a central first articulation angle range with articulation angles (β) of up to plus/minus fifteen degrees (β=0°±15°) about the joint center plane (EM) and an adjacent second articulation angle range with articulation angles (β) of greater than fifteen degrees in magnitude (β=+15°); wherein at an articulation angle of zero degrees (β=0°), the opening angle (δ) is greater than zero degrees (δ>0°), and wherein the opening angle (δ) increases within at least a portion of the central first articulation angle range by at least two degrees, and the opening angle (δ) for all articulation angles (β) within the central articulation angle range is less than twelve degrees (δ<12°).

An advantage of this constant velocity joint is that a reliable cage control of the ball cage is ensured even at small articulation angles of up to fifteen degrees around the joint center plane. Due to the relatively small opening angles (δ), only low reaction forces occur between the joint parts being in contact, so that friction losses are accordingly low.

When the constant velocity joint rotates under articulation, the torque transmitting balls move along the ball tracks. Thereby, viewed in the joint articulation plane, the ball moving to the opening side of the outer joint part is guided into an opening-sided track section of the outer joint part and into an attachment-sided track section of the inner joint part. The ball moving toward the attachment side of the outer joint part, viewed in the joint articulation plane, is guided into an attachment-sided track section of the outer joint part and into an opening-sided track section of the inner joint part.

The opening angles are defined between an outer tangent to the outer ball track and an inner tangent to the inner ball track, respectively in a contact area with the ball guided in the outer and inner ball track. The opening angle refers to the joint articulation plane which is spanned by the longitudinal axes of the outer joint part and inner joint part, respectively to a pair of tracks lying in the joint articulation plane with a ball received therein. The contact area between a ball and a ball track can be located directly in the joint articulation plane, for example in the case of a circular track cross-section whose cross-section radius corresponds to the radius of the ball, or in planes offset parallel to the joint articulation plane, which are spanned by the ball contact lines between the ball and the ball tracks, for example in the case of a cross-section of the ball tracks deviating from the circular shape. In the latter case, the projections of the tangents applied to the respective ball track are considered in the joint articulation plane, which include the opening angle.

The at least one ball track is designed such that, when the joint is aligned ($\beta=0°$), the opening angle ($\delta$) is greater than zero degrees ($\delta>0°$), in particular greater than one degree ($\delta>1°$). Preferably, the opening angle ($\delta$) is less than eight degrees ($\delta<8°$) when the joint is aligned ($\beta=0°$), in particular less than six degrees ($\delta<6°$). Due to a relatively small opening angle with the joint aligned, the axial forces effective between the ball tracks and the balls along the ball tracks are low.

Starting from the aligned position of the joint, respectively the joint center plane, the opening angle substantially increases with increasing angulation. In this regard, the at least one pair of tracks is configured such that the opening angle ($\delta$) increases within the first articulation angle range by preferably at least two degrees. The at least one pair of tracks has a second articulation angle range adjoining the central articulation angle range. The second articulation angle range includes articulation angles ($\beta$) that are greater than 15° with respect to their absolute value, that is, that are less than minus 15° or greater than plus 15° ($\beta=0°+15°$). In particular, it is provided that at least one opening angle ($\delta$) within the second articulation angle range is larger than a largest opening angle of the central articulation angle range.

At least one of the pairs of tracks of the constant velocity joint has the shape according to the invention with an opening angle of greater than zero degrees when the joint is aligned and an opening angle increasing by at least 2° within the central articulation angle range. Herewith it is included that also two or more pairs of tracks have the specified design, wherein the number of balls and/or pairs of ball tracks can be even and respectively two pairs of tracks with the specified design are arranged diametrically opposite to each other. It is thus to be understood that—as far as in the context of the present disclosure it is referred to at least one, one and/or the pair of tracks—the respective feature described can also refer to one, several or all pairs of tracks.

The at least one ball track is configured at least in the central articulation angle range such that the opening angles in the opening-sided ball track section and in the attachment-sided ball track section face in the same axial direction. By opening angles facing in the same axial direction, it is meant that the resulting force acting from the outer and inner ball tracks on a ball moving in the joint articulation plane towards the attachment side has an axial force component pointing in the same axial direction as the resulting axial force component acting on a ball moving towards the opening side. This configuration ensures that the ball cage is controlled at least approximately to the angle bisecting plane. If present, the other pairs of tracks also comprise mouth openings which preferably point in the same axial direction as the mouth openings of the pairs of tracks according to the invention. All pairs of tracks can be designed such that the opening angles $\delta$ of all balls open in the same axial direction when the joint is articulated, respectively viewed in the joint articulation plane. This can also apply to the second articulation angle range adjoining the central articulation angle range. Furthermore, for efficient production it is preferred that all outer ball tracks are equally formed among each other, and all inner ball tracks are equally formed among each other.

The number of pairs of tracks and/or torque-transmitting balls can be selected as required according to the specific requirements of the constant velocity joint. In a driveline of a motor vehicle, constant velocity joints with six or eight balls are generally used, although any other number, including an odd number, is also conceivable. In an exemplary joint with eight pairs of tracks and eight balls, the opening angle ($\delta$) can be less than or equal to six degrees ($\delta \leq 6°$) in the central articulation angle range and accordingly greater than six degrees ($\delta>6°$) in the second articulation angle range. In an exemplary joint with six pairs of tracks and six balls, the opening angle ($\delta$) can be less than or equal to twelve degrees ($\delta \leq 12°$) in the central articulation angle range and accordingly greater than twelve degrees ($\delta>12°$) in the second articulation angle range. The increase of the opening angle ($\delta$) within the central articulation angle range can be in particular at least four degrees for a 6-ball joint (e.g. $\delta 15 - \delta 0 > 4°$).

According to a preferred specification, the ball cage has a spherical outer face for guiding the ball cage with respect to an inner face of the outer joint part and a spherical inner face for guiding the ball cage with respect to an outer face of the inner joint part. An axial offset may be provided between a center of the spherical outer face and a center of the spherical inner face. By this measure, good cage control is achieved when the constant velocity joint is articulated. However, it is also possible for the centers of the spherical inner face and outer face to lie in one plane. A radial clearance can be provided between the outer spherical face of the ball cage and the inner spherical face of the outer joint part and/or between the inner spherical face of the ball cage and the outer spherical face of the inner joint part.

The centers of the balls define a center line (A, A') when moving along the outer and inner ball tracks, viewed in the joint articulation plane. According to a preferred specification, the center line (A, A') over its length comprises at least two track sections with different curvature. The at least two track sections with different curvature can be located within the central section and/or within the opening-sided section and/or within the attachment-sided section of the outer and inner ball tracks. It is also possible that the center line (A, A') comprises at least two subsections of different curvature within at least one of the attachment-sided track section and the opening-sided track section of the outer joint member.

The center line (A, A') can have at least one change of curvature within the first articulation angle range. By change in curvature is meant in this context any change in the gradient of the center line in a mathematical sense, such as a change from a circular arc with a larger radius to a circular arc with a smaller radius or to a straight line. It is understood that the center line may also be a higher order curve, in which case change in curvature is to also be understood here to mean a change in gradient along the higher order curve.

According to a possible embodiment, the outer ball track is configured such that an outer center line (A) in the central articulation angle range is formed by an outer circular arc around an outer central section center (Mz), with the outer central section center (Mz) having an axial offset in a first axial direction with respect to the joint center (M), and the inner ball track is configured such that the inner center line (A') in the central articulation angle range is formed by an inner circular arc around an inner central section center (Mz), with the inner central section center (Mz') having an axial offset in a second axial direction with respect to the joint center (M).

In the attachment-sided track section of the outer joint part, an outer ball track can be configured in particular such that the center line (A) runs radially outside a circular arc section (Cr) defined by a reference radius (Rr). The reference radius (Rr) may be defined as extending from a reference radius center (Mr) to the center plane intersection of the center line (A) with the joint center plane (EM), with the reference radius center (Mr) being offset relative to the joint center plane (EM) towards the opening side of the outer joint part. The reference radius (Rr) can be smaller than the curvature of the attachment-sided track section.

The track section adjoining the central section on the opening side of the inner joint part is configured corresponding to the track section of the outer joint part on the attachment side. This means that the opening-sided track section of the inner joint part is configured such that the associated center track of this track section is mirror-symmetrical to the center track of the attachment-sided track section of the outer joint part with respect to an angle-bisecting plane. This applies to each of the pairs of tracks.

In a mounted condition of the constant velocity joint, a boot can be provided to seal the joint chamber. The boot can be mounted with pretension.

In the context of the present disclosure, the track angle $\beta/2$ is understood to be the angle that a radius around the joint center M to the ball center of one of the torque-transmitting balls encloses with the joint center plane EM. In this context, the track angle $\beta/2$ in any angular position of the joint is usually half of the joint articulation angle $\beta$, i.e. the track angle $\beta/2$ of, for example, up to 15° corresponds to a joint articulation angle of 30°.

Due to the guidance of the ball cage relative to the spherical inner face of the outer joint part and/or the spherical outer face of the inner joint part, the constant velocity joint is configured in the form of a fixed joint that permits displacement movements only within the limits of the axial clearance between the outer joint part and inner joint part.

BRIEF SUMMARY OF THE DRAWINGS

Examples are explained below with reference to the drawing figures, which show.

DESCRIPTION

Figure 1A:
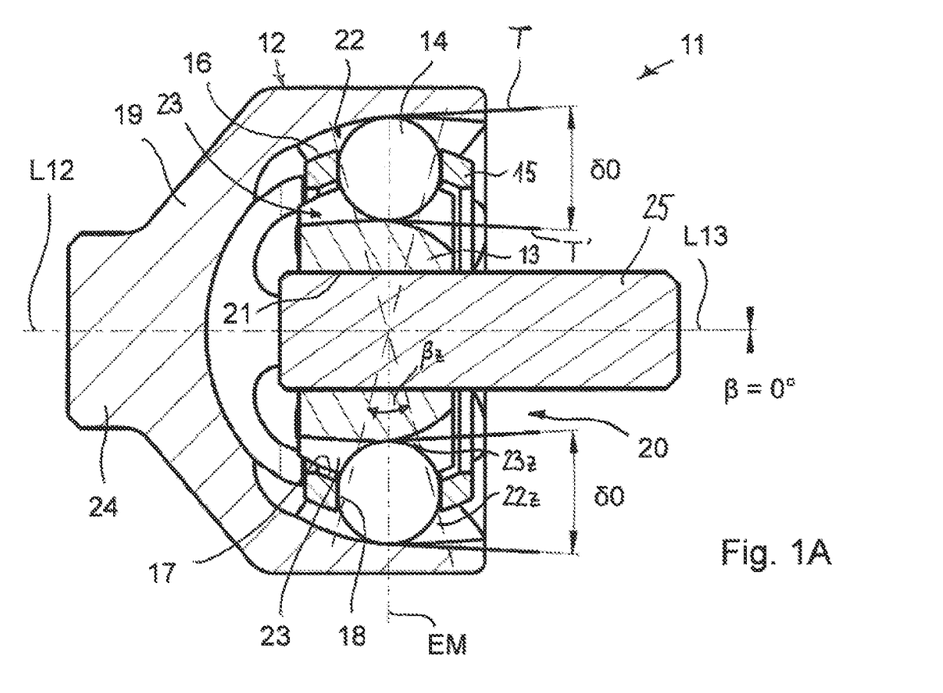
FIG. 1A) shows a constant velocity joint in a first embodiment in aligned position in longitudinal section.
Figure 1B:
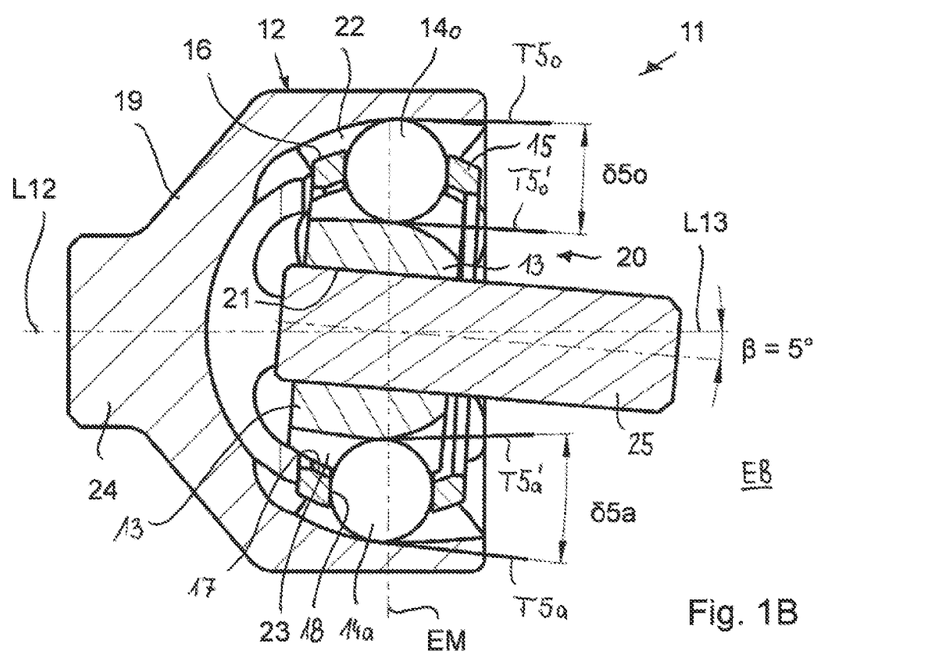
FIG. 1B) shows the joint of FIG. 1A) at an articulation angle of 5°.
Figure 1C:
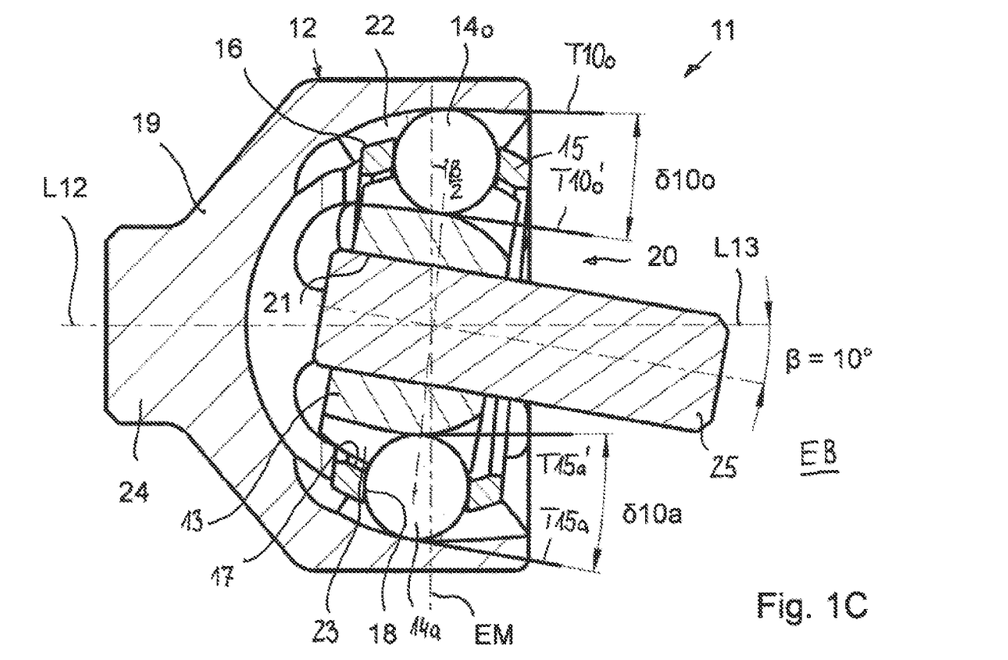
FIG. 1C) shows the joint of FIG. 1A) at an articulation angle of 10°.
Figure 1D:
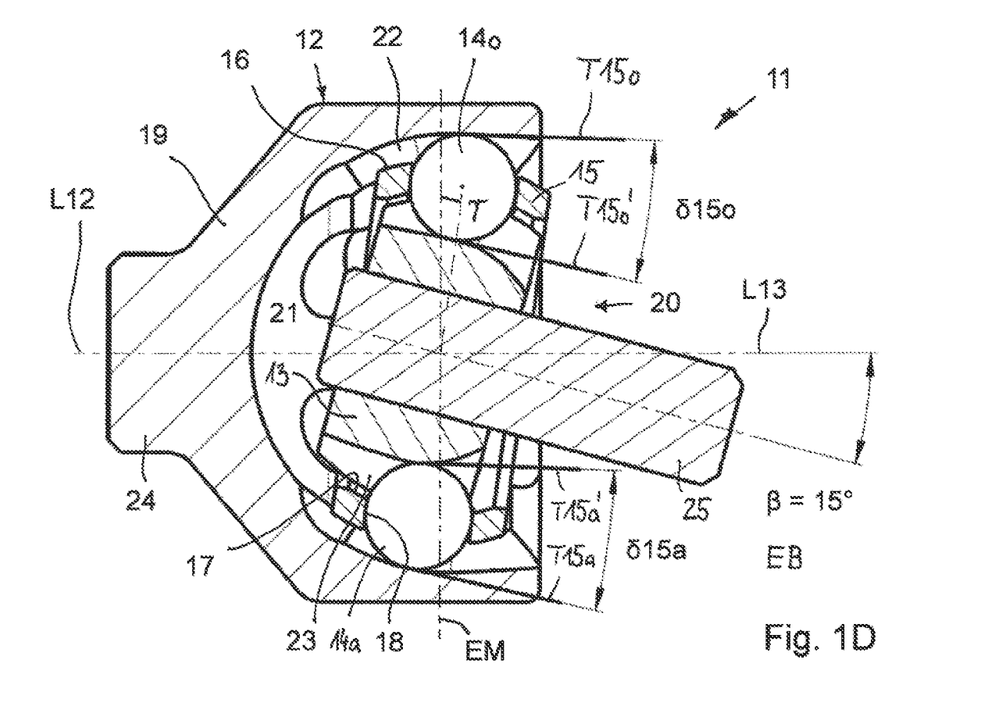
FIG. 1D) shows the joint of FIG. 1A) at an articulation angle of 15°.
Figure 1E:
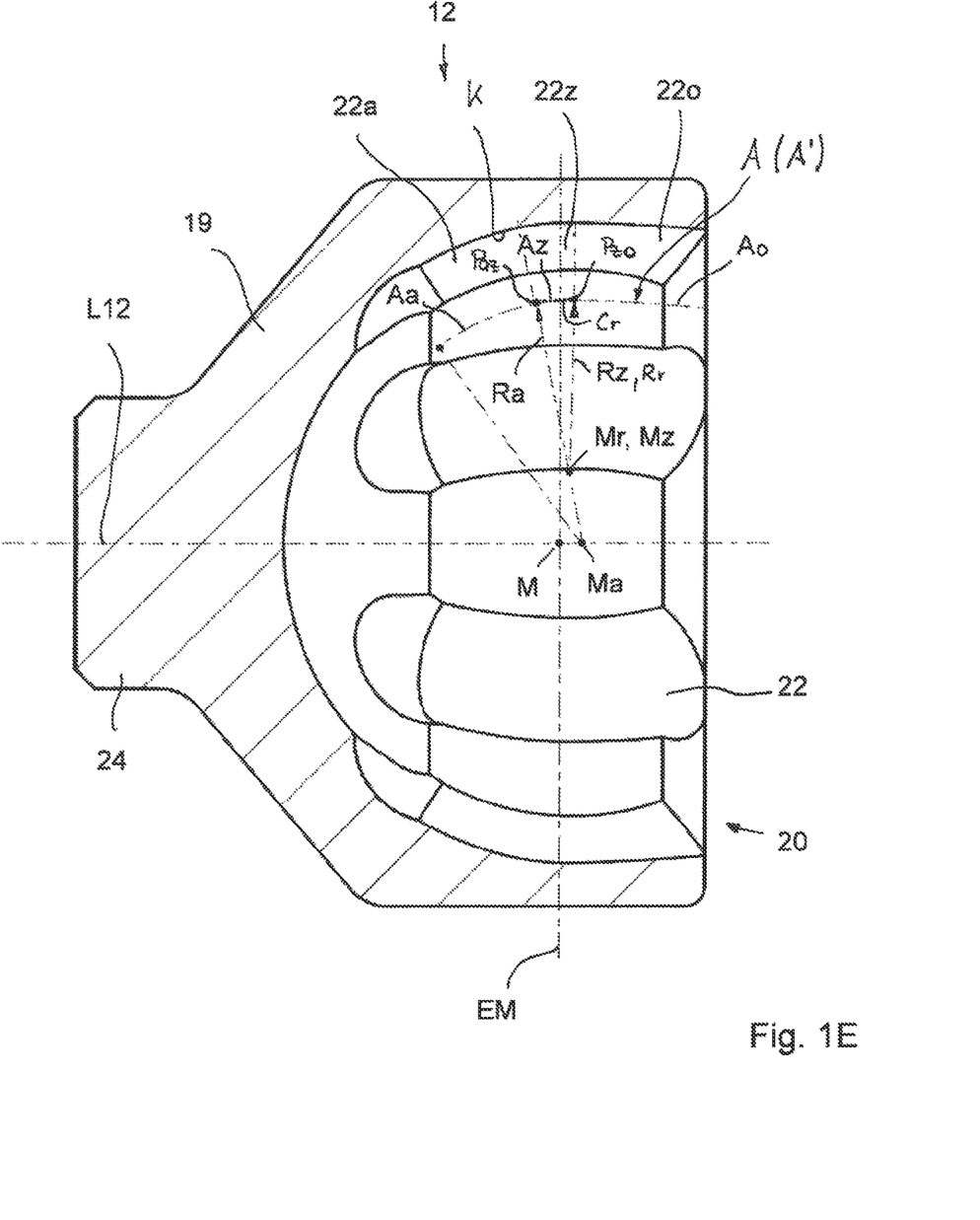
FIG. 1E) shows the outer joint part of FIG. 1A) in longitudinal section.
Figure 2:
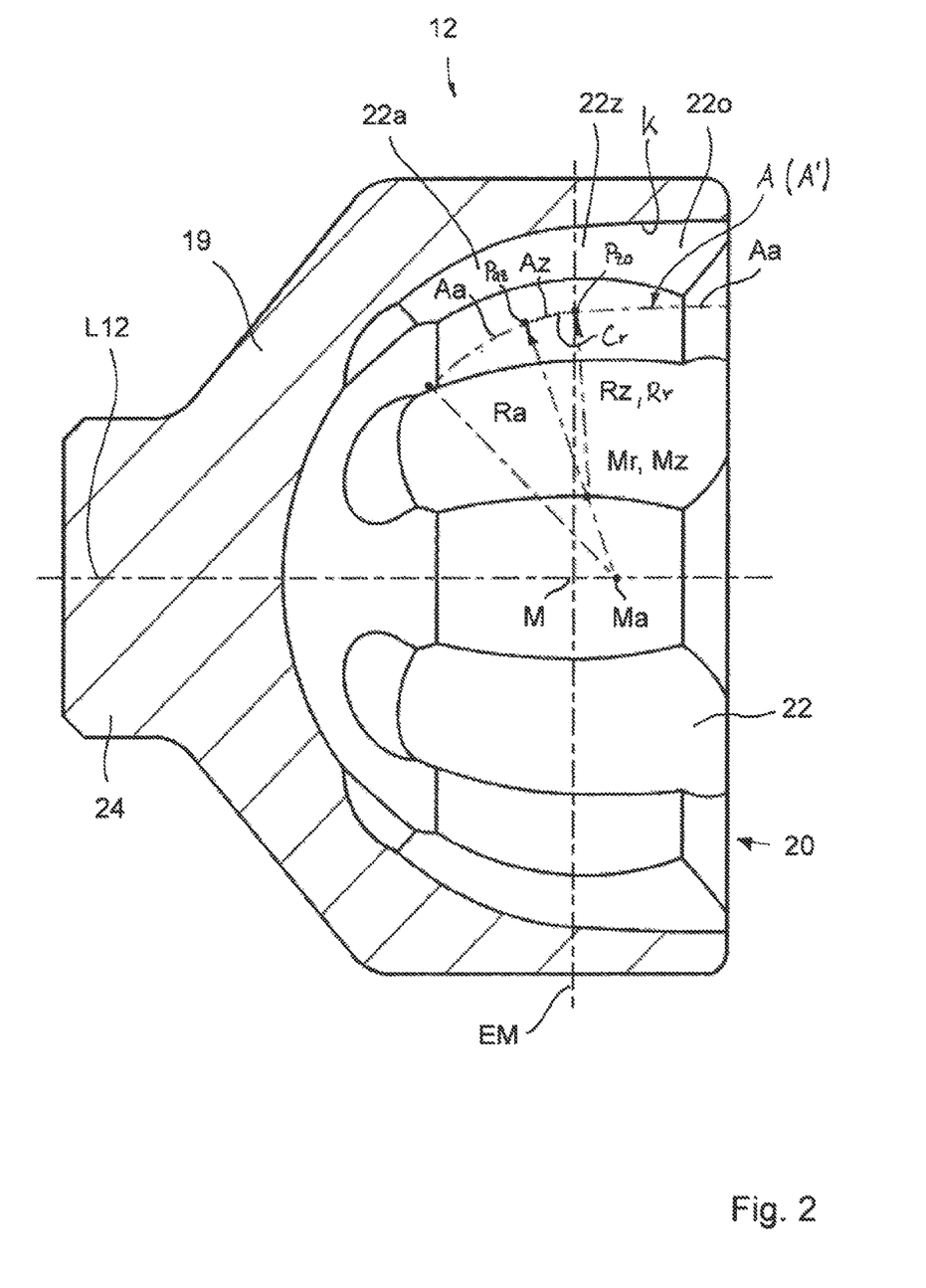
FIG. 2 shows the outer joint part of a constant velocity joint in a modified second embodiment in a longitudinal section.
Figure 3:
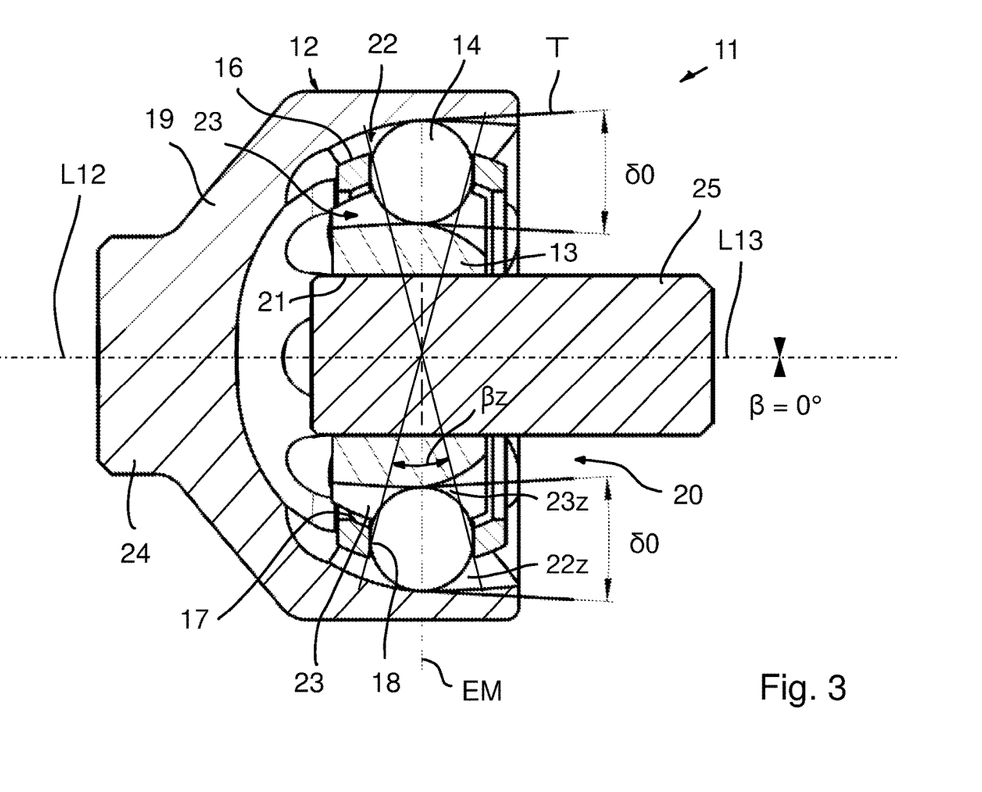
FIG. 3 shows the joint of FIG. 1A) with a further track being included in the half section to show a constant velocity joint with eight ball tracks.

FIGS. 1A) to 1E), and FIG. 2, and FIG. 3 are initially described together below with regard to their common features. A constant velocity universal joint 11 is shown. The constant velocity joint 11 comprises an outer joint part 12, an inner joint part 13, torque transmitting balls 14, and a ball cage 15. The ball cage 15 has a spherical outer face 16 guided in the outer joint part 12 and a spherical cage inner face 17 guided on the inner joint part 13. The balls 14 are held in circumferentially distributed cage windows 18 in the ball cage 15 in the joint center plane EM. A longitudinal axis L12 is designated at the outer joint part 12, and a longitudinal axis L13 is designated at the inner joint part 13. The point of intersection of the longitudinal axes L12, L13 with the joint center plane EM forms the joint center M.

Clearance is provided between the spherical inner face 17 of the ball cage 15 and a spherical outer face of the inner joint part 13, and between the spherical outer face 16 of the ball cage 15 and a spherical inner face of the outer joint part 12, respectively.

The outer joint part 12 has a base 19, to which a connecting journal 24 is connected, and an opening 20. The inner joint part 13 has an opening into which the journal of a drive shaft 25 is inserted in a rotationally fixed manner for transmitting a torque. The position of the base 19 hereinafter denotes the axial direction "towards the attachment side", and the position of the opening 20 hereinafter denotes the axial direction "towards the opening side". These terms are also used with reference to the inner joint part 13, with the actual connection of the shaft 25 to the inner joint member 13 not being taken into account. It is understood that the outer joint part, instead of the bottom, can also be designed to be open towards the attachment side, as is the case, for example, with a disc joint.

Outer ball tracks 22 of the constant velocity joint 11 are formed in the outer joint part 12 and inner ball tracks 23 are formed in the inner joint part 13. Respectively an outer ball track 22 and an inner ball track 23 are located opposite each other and jointly form a pair of tracks with each other, in which a torque-transmitting ball 14 is guided. The opposing outer and inner ball tracks 22, 23 can lie in radial planes around the respective longitudinal axis L12, L13. The radial planes have respectively the same angular distance from one another. However, it is also conceivable that two pairs of tracks adjacent to each other in the circumferential direction run in mutually parallel planes which are parallel to the longitudinal axis L12, L13. This design is also known as a "twin-ball" joint. When the joint is articulated, that is upon angular movement of the inner joint part 13 relative to the outer joint part 12, the balls 14 are guided out of the joint center plane EM at least approximately into the angle bisecting plane between the longitudinal axis L12 of the outer joint part 12 and the longitudinal axis L13 of the inner joint part 13. By at least approximately it is meant that the plane defined by the ball centers of the balls 14 lies within an angular range of ±10% around the angle bisecting plane, and in particular can correspond thereto.

The shape of the outer ball tracks 22, which at least largely corresponds to the shape of the inner ball tracks, can be seen in particular in FIG. 1E. The balls 14 are in contact with the outer ball tracks 22 in the outer joint part 12 and inner ball tracks 23 in the inner joint part 13. The balls 14 form, in longitudinal section, an outer contact line K in the contact area with the outer ball tracks 22 and an inner contact line K' in the contact area with the inner ball tracks 23. The balls 14 are shown with contact in the track base of the ball tracks 22, 23, which however need not necessarily be given. Thus, the outer and inner contact lines K, K' may be located in the track base, as shown, that is, in a radial plane containing the longitudinal axes L12, L13, or in planes parallel to the longitudinal axes. When moving along the outer and inner ball tracks 22, 23, the centers of the balls 14 each define a center line A, A'. The center lines A, A' run parallel to the respective contact line K, K'. To describe the ball tracks 22, 23, reference can be made either to the contact lines K, K' in the track base or to the center lines A, A', which are defined by the sum of the ball centers during angular movements of the joint. Herein, the ball center line A refers to the line of the ball centers of the balls 14A along the outer ball tracks 22 in the outer joint part 12, and A' refers to the ball center line of the corresponding inner ball tracks 23 in the inner joint part 13.

In the following, it is enlarged upon the special features of the constant velocity joint according to the invention, in particular the design of the ball tracks 22, 23. The following definitions apply in connection with the constant velocity joint and the design of the ball tracks herein, respectively:

The tangent angle α defines the angle enclosed between a tangent T to a center line A, A' and/or a contact line K, K' of the outer joint part 12 respectively inner joint part 13 at any track point and the longitudinal axis L12, L13 of the outer joint part and/or inner joint part.

The joint articulation angle β defines the angle included between the longitudinal axis L12 of the outer joint part 12 and the longitudinal axis L13 of the inner joint part 13. The joint articulation angle β is zero when the joint is aligned.

The track angle β/2 defines the angle that a radius around the joint center M to the ball center encloses with the joint center plane EM. The track angle β/2 is always half of the joint articulation angle β in any angular position of the joint.

The opening angle δ defines the angle enclosed by tangents T, T' to the balls 14 in the points of contact with the first ball tracks 22 and the second ball tracks 23, respectively. The systematics in the present disclosure is such that the opening angle, which can assume various values over the technically possible range of articulation angles, is generally denoted by δ; selected specific articulation angles can be supplemented with the respective articulation angle and an indication of the position of the ball (for example, δ0 for the opening angle at a articulation angle of zero or δ15o for the opening angle at the opening-side ball at an articulation angle of 15°).

The center plane EM is defined by the ball centers of the torque transmitting balls 14 when the joint is aligned.

A reference radius Rr for the ball center line A of the outer joint part 12, respectively for the ball center line A' of the inner joint part 13, is defined around the reference radius center Mr by a center plane intersection of the respective center line A, A' with the joint center plane EM. Here, the reference radius center Mr is offset from the joint center plane EM by an axial offset corresponding to the product of the pitch circle radius with the sine of the track angle β/2.

The reference radius Rr for the center line A, A' defines a reference arc Cr.

FIGS. 1A) to 1D) show the constant velocity joint in various angular positions, FIG. 1A) with the outer joint part 12 and inner joint part 13 coaxially aligned, i.e. articulation angle ß=0°, FIG. 1B) with an articulation angle of 5°, FIG. 1C) with an articulation angle of 10° and FIG. 1D) with an articulation angle of 15°. FIG. 1E) shows the outer joint part 12 with its center line A and contact line K, which are equidistant to each other. In the present case, the constant velocity joint 11 comprises a number of six balls 14 and six pairs of tracks 22, 23, respectively, although it is understood that another number is conceivable. The center line A of the outer joint part 12 comprises, starting from the opening side towards the direction of the attachment side in the order indicated, an opening-sided section Ao extending from the opening side of the outer joint part 12 in the direction of the attachment side, a central section Az continuously adjoining the opening-sided section Ao, and an attachment-sided section Aa continuously adjoining the central section Az.

Accordingly, the center line A' of the inner joint part 13, which is not shown separately, comprises, starting from the opening side in the direction towards the attachment side, an opening-side section Ao', a central section Az' continuously adjoining thereto, and an attachment-sided section Aa' continuously adjoining thereto, in the sequence indicated.

The central track portion 22z of the outer ball track 22 and the central track portion 23z of the inner ball track 23 lie within a joint articulation angle range βz of ±15° about the joint center plane EM and include same. It can be seen in FIG. 1A) that an outer central contact line tangent T applied to the outer contact line K at an articulation angle β of zero degrees and an inner central contact line tangent T' applied to the inner contact line K' enclose an opening angle δo with each other that is unequal zero degrees. Preferably, the opening angle δo is at least 1° and/or at most 8° when the joint is aligned. Presently, the ball tracks are configured such that the opening angle δo is about 6° when the joint is aligned. Due to the comparatively small opening angle δo when the joint is aligned, only small axial forces act from the ball tracks 22, 23 on the balls 14, which has a friction-reducing effect on the joint.

Furthermore, it can be seen in FIGS. 1B) to 1E), which show the constant velocity joint 11 at articulation angles ß of 5°, 10° and 15°, that the outer and inner ball tracks 22, 23 are configured such that, in the joint articulation plane, opening angles δ are generated both at the ball 14o (upper half of the figure) moving from the joint center plane EM in the direction of the opening side, as well as at the ball 14a (lower half of the figure) moving from the joint center plane EM in the direction of the attachment side, which opening angles δ open in the same axial direction. This means that the resulting axial forces acting from the ball tracks 22, 23 on the balls 14 due to the opening angles δ thus act in the same axial direction.

The opening angles δ are each enclosed by an outer contact line tangent T applied to the outer contact line K at the respective ball 14 and an inner contact line tangent T' applied to the inner contact line K' of said ball 14. A central articulation angle range is defined herein as including articulation angles of up to plus/minus fifteen degrees (β=0°±15°) about the joint center plane EM, that is, including an articulation angle range βz of −15° to +15° (−15°<βz<15°). An adjoining second articulation angle range comprises articulation angles β that are greater than fifteen degrees in magnitude, that is, articulation angles β that are greater than 15° and such that are less than −15° (β<−15° or β>15°).

For an articulation angle ß of 5° at the ball 14o moving in the joint articulation plane in the direction of the opening side a first opening angle δ5o is formed between the outer tangent T5o and the inner tangent T5o', which in the present embodiment is in particular about 2°, while at the ball 14*a* moving in the joint articulation plane in the direction of the attachment side a second opening angle 65*a* is formed between the outer tangent T5a and the inner tangent T5a', which in particular is about 8°.

At a larger articulation angle ß of 10°, the opening angles δ10o, δ10a at an opening-sided and attachment-sided ball 14*o*, 14*a* are in the present embodiment each larger than at the articulation angle of 5°. Herein, the opening angle δ10o at the opening-sided ball 14*o* is in particular about 6.5°, while the opening angle δ10a at the attachment-sided ball 14*a* is in particular about 10°.

At a further larger articulation angle ß of 15°, the opening angles δ15o, δ15a at an opening-sided and attachment-sided ball 14*o*, 14*a* are each larger than at the articulation angle of 10°. Herein, the opening angle δ15o at the opening-sided ball 14*o* is in particular about 11°, while the opening angle δ15a at the attachment-sided ball 14*a* is in particular about 10.5°.

It is understood that the mentioned opening angles δ for the mentioned articulation angles ß are exemplary and depend on the selected track shape. Overall, it is provided that the opening angle δ increases by at least two degrees (δ15−δ0>2°) at least within a sub-section of the central articulation angle range ßz, and that the opening angle δ for all articulation angles β within the central articulation angle range βz is less than twelve degrees (δ<12°).

Compared with known fixed joints, the aforementioned opening angles δ are comparatively low, which leads to lower friction losses between the components moving relative to each other. The ball tracks are preferably configured such that the opening angles δ of the balls 14*a* moving on the opening side and the balls 14*a* moving on the attachment side are at least approximately equal. However, a certain deviation in size of the opening-sided and attachment-sided opening angles from each other is permissible, for example in the range of up to ±10%.

With further articulation outside the central articulation angle range, i.e. articulation angles of more than 15° in terms of absolute value, the opening angles δ increase further. At an angle of 30° the opening angle at the opening-sided ball 14*o* can be between 30° and 40°, for example, while the opening angle at the attachment-sided ball 14*a* can be between 15° and 30°, for example, without being restricted thereto. It is theoretically conceivable that the opening angles δ at the opening-sided and attachment-sided balls 14 may also point in opposite axial directions at larger joint articulation angles β, which are greater than 40°. In any case, however, the ball tracks are configured such that the opening angles δ at the opening-sided and attachment-sided balls 14, open in the same axial direction during joint articulation at least up to an articulation angle β of at least 30°. This measure achieves good cage control, in particular also at large articulation angles β.

FIG. 1E) shows further details of the track shape of the outer ball tracks 22 of the outer joint part 12. The reference radius Rr is drawn in, whose radius center Mr is axially and radially offset from the joint center M and whose end is defined by the intersection of the center line A with the joint center plane EM. The individual track sections 22*o*, 22*z*, 22*a* and, respectively, the individual center line sections Ao, Az, Aa are identified by their different curvatures or radii.

The ball tracks 22, 23 of the present constant velocity joint have two changes in curvature without being restricted thereto. In this context, a change in curvature means any change in the gradient of the center line in a mathematical sense.

A first curvature change point Pzo is formed between the opening side track section 22*o* and the central track section 22*z*. The curvature change point Pzo is offset from the joint center plane EM toward the opening side. A line running through the joint center M and the curvature change point Pzo encloses an angle with the joint center plane EM that can be for example smaller than 5°, in particular smaller than 4°. The opening-sided track section 22*o* is here formed by a straight line without being restricted thereto. The straight line runs approximately parallel to the longitudinal axis L12 or forms a small angle therewith; however, a configuration would also be conceivable with the opening-sided track section being formed by a circular arc or a curve of higher order.

The adjoining central track section 22*z* is formed by an circular arc with radius Rz around the circle center Mz, without being restricted thereto. With respect to the joint center M, the circle center Mz is offset axially in the direction of the opening side and radially in the direction of the ball track. The radial offset of the circle center Mz from the center M is greater than the axial offset. The circular arc around the point Mz defines the central center line section Az between the two curvature change points Pzo and Paz. The curvature change point Paz is offset from the joint center plane EM toward the attachment side. A line running through the joint center M and the curvature change point Paz encloses an angle with the joint center plane EM which can be smaller than 10°, for example, in particular smaller than 8°.

The adjoining track section 22*a* on the attachment side is formed by an arc of a circle with radius Ra around the center of the circle Ma. It can be seen that the radius Ra of the attachment-sided track section 22*a* is larger than the radius Rz of the central track section 22*z*. The circle center Ma of the attachment-sided track section 22*a* is located on the longitudinal axis L12 and is axially offset from the joint center M in the direction towards the opening side, although other configurations with radial offset of the circle center Ma are also conceivable.

The central radius Rz defines a reference radius Rr with a reference arc around the center point Mz (Mr). It is provided geometrically that the center line A in the opening-sided track section Ao lies radially outside the reference arc of the reference radius Rr. This is achieved, as described above for the ball track of the present outer joint part 12, by a straight ball track in the direction of the opening side. In the central track section 22*z*, which extends between the points Pzo and Paz, the center line section Az coincides with the reference radius Rr. The attachment-sided track section 22*a*, which extends from the transition point Paz in the direction of the attachment side, again lies with its corresponding center line section Az radially outside the reference circle arc of the reference radius Rr. However, it is understood that other track shapes are also possible here, for example that the center line A in the direction of the attachment side runs radially within or on the reference circle arc defined by the reference radius RR.

The inner joint part 13 (not shown separately) of the constant velocity joint 11 according to the invention has a ball center line A' which is designed complementary to the ball center line A of the outer joint part 12. That is, the ball center line A' of the inner joint part 13 is mirror symmetrical to the ball center line A of the outer joint part 12 with respect to the joint center plane EM, respectively with respect to the angle bisecting plane between the longitudinal axis L12 of the outer joint part 12 and the longitudinal axis L13 of the inner joint part 13. With regard to the course of the ball center lines A' of the inner joint part 13, to avoid repetitions it is thus referred to the information provided in connection with the description of the ball tracks of the outer joint part 12.

FIG. 2 shows an outer joint part 12 of a constant velocity joint according to the invention in a modified second embodiment. This corresponds largely to the embodiment according to FIG. 1, the description of which it is thus referred to. The same and/or modified details are marked with the same reference signs as in FIG. 1.

A difference to the above embodiment is that the transition point Pzo is in the present embodiment located in the joint center plane EM. This results in an opening-sided track section 22o which opens slightly, i.e. the straight center line section Aa encloses a small angle, for example less than 5°, with the longitudinal axis L12, which opens in the direction of the opening side. The transition point Paz is offset further away from the joint center plane EM than in the above embodiment. In this respect, in the present embodiment, it is provided that a line passing through the joint center M and the curvature change point Paz includes an angle with the joint center plane EM that is, for example, greater than 10° and less than 15°, without being limited thereto. The inner joint part, which is not shown separately, has a complementary configuration to the outer joint part 12. The remaining details correspond analogously to the above embodiment.

For both embodiments shown it applies that, when the articulation angle β is zero degrees (β=0°), the opening angle δ is greater than zero degrees (δ>0°), furthermore that the opening angle δ increases by at least two degrees at least within the articulation angle range βz of ±15° (δ15'-δ0>2°), and that the opening angle δ is less than twelve degrees (δ<12°) for all articulation angles β within the central articulation angle range. In this way, a reliable cage control of the ball cage 15 is ensured even for small articulation angles β of up to fifteen degrees about the joint center plane EM. Due to the relatively small opening angles δ, only small reaction forces occur between the joint parts being in contact, so that friction losses are respectively low.

LIST OF REFERENCE SIGNS 11 constant velocity joint
12 outer joint part
13 inner part of joint
14 ball
15 ball cage
16 outer spherical face
17 inner spherical face
18 windows
19 attachment side
20 opening side
22 outer ball track
22a,z,o track sections
23 inner ball track
24 journal
25 drive shaft
A, A' center line
Aa, Az, Ao center lines
Cr reference circle arc
EB joint articulation plane
EM joint center plane
K contact line
L longitudinal axis
Paz transition point
Pzo curvature change point
R, Ra, Rz radius
Rr reference radius
M joint center
Ma, Mz, Mo center points
T, T' tangent
β joint articulation angle
δ opening angle

The invention claimed is:

1. A constant velocity joint, comprising:
an outer joint part with a longitudinal axis and outer ball tracks, wherein the outer joint part has an attachment side and an opening side,
an inner joint part with a longitudinal axis and inner ball tracks,
wherein an outer ball track and an inner ball track respectively form a pair of tracks with each other,
a torque transmitting ball in each pair of tracks,
a ball cage arranged between the outer joint part and the inner joint part and comprising circumferentially distributed cage windows, each of which receiving at least one of the torque-transmitting balls,
wherein, with the longitudinal axis of the inner joint part and the longitudinal axis of the outer joint part being coaxially aligned, the balls in the ball cage define a joint center plane, wherein the longitudinal axis of the inner joint part and the longitudinal axis of the outer joint part at articulation angles deviating from zero degrees defining a joint articulation plane;
wherein, viewed in the joint articulation plane, in any angular position of the constant velocity joint an opening angle is formed between an outer tangent applied to the outer ball track in an outer contact point between the outer ball track and the ball and an inner tangent applied to the inner ball track in an inner contact point between the inner ball track and the ball,
wherein centers of the balls each define a center line when moving along the outer and inner ball tracks, and a first articulation angle range is defined that includes articulation angles β that have an absolute value of less than fifteen degrees ($-15°<\beta<15°$),
wherein for at least one of the pairs of tracks:
the opening angle is greater than zero degrees, for an articulation angle of zero degrees,
the opening angle increases by at least two degrees within at least a portion of the first articulation angle range, and
the opening angle is less than twelve degrees for all articulation angles within the first articulation angle range.

2. The constant velocity joint of claim 1,
wherein the opening angle at the articulation angle of zero degrees is greater than one degree.

3. The constant velocity joint according to claim 1,
wherein the opening angle at the articulation angle of zero degrees is less than eight degrees.

4. The constant velocity joint according to claim 1,
wherein the opening angle increases by at least four degrees within the first articulation angle range.

5. The constant velocity joint according to claim 1,
wherein the at least one pair of tracks has a second articulation angle range comprising articulation angles that have an absolute value of greater than or equal to 15° ($\beta \leq -15°$ or $\beta \geq 15°$, wherein at least one opening angle within the second articulation angle range is greater than a largest opening angle of the first articulation angle range.

6. The constant velocity joint according to claim 1, wherein eight pairs of tracks and eight balls are provided, wherein the opening angle in the first articulation angle range is at most six degrees.

7. The constant velocity joint according to claim 1, wherein six pairs of tracks and six balls are provided, wherein the opening angle in the first articulation angle range is at most twelve degrees, and the opening angle increases by at least four degrees within the first articulation angle range.

8. The constant velocity joint according to claim 1, wherein the at least one pair of tracks is configured such that, at any articulation angle within the first articulation angle range, an opening-sided opening angle at a ball moving in the joint articulation plane to the opening side of the outer joint part and an attachment-sided opening angle of a ball moving at the same articulation angle in the joint articulation plane to the attachment side of the outer joint part open in the same axial direction.

9. The constant velocity joint according to claim 8, wherein the outer ball track is configured such that the center line in the attachment-sided track section of the outer joint part runs radially outside a circular arc section defined by a reference radius, wherein the reference radius extends from a reference radius center to the center plane intersection of the center line with the joint center plane, wherein the reference radius center is offset with respect to the joint center plane towards the opening side of the outer joint part.

10. The constant velocity joint according to claim 1, wherein the outer ball track is configured such that the center line in the opening-sided track section of the outer joint part runs radially outside a circular arc section defined by a reference radius, wherein the reference radius extends from a reference radius center to the center plane intersection of the center line with the joint center plane, wherein the reference radius center is offset with respect to the joint center plane towards the opening side of the outer joint part.

11. The constant velocity joint according to claim 1, wherein the ball cage has a spherical outer face for guiding the ball cage with respect to an inner face of the outer joint part and a spherical inner face for guiding the ball cage with respect to an outer face of the inner joint part, wherein an axial offset is provided between a center of the spherical outer face and a center of the spherical inner face.

12. The constant velocity joint according to claim 1, wherein each center line respectively has at least two track sections with different curvature along their length.

13. The constant velocity joint according to claim 1, wherein each center line respectively has at least one curvature change point within the first articulation angle range.

14. The constant velocity joint according to claim 1, wherein all ball tracks are configured such that within the second articulation angle range the opening angles of all balls open in the same axial direction, viewed respectively in the joint articulation plane.

15. The constant velocity joint according to claim 1, wherein all ball tracks are configured such that the opening angles at all balls are greater than zero degrees when the joint is aligned.

16. The constant velocity joint according to claim 1, wherein the outer ball track is configured such that the outer center line has a central outer section formed by an outer circular arc about an outer central section center, the outer central section center having an axial offset in a first axial direction relative to the joint center, and wherein the inner ball track is configured such that the inner center line has a central inner section formed by an inner circular arc about an inner central section center, the inner central section center having an axial offset in a second axial direction relative to the joint center point.

17. The constant velocity joint according to claim 1, wherein the inner ball track is configured mirror symmetrical to the outer ball track with respect to an angle bisecting plane between the longitudinal axis of the outer joint part and the longitudinal axis of the inner joint part.

* * * * *

UNITED STATES PATENT AND TRADEMARK OFFICE
CERTIFICATE OF CORRECTION

| | |
|---|---|
| PATENT NO. | : 11,815,138 B2 |
| APPLICATION NO. | : 17/257594 |
| DATED | : November 14, 2023 |
| INVENTOR(S) | : Stephan Maucher et al. |

It is certified that error appears in the above-identified patent and that said Letters Patent is hereby corrected as shown below:

In the Claims

Column 13, in Line 36, replace "according to claim 1," with --according to claim 8,--.

Signed and Sealed this
Twenty-sixth Day of December, 2023

Katherine Kelly Vidal
*Director of the United States Patent and Trademark Office*